United States Patent
Thomas (10) Patent No.: US 9,707,728 B2
(45) Date of Patent: *Jul. 18, 2017

(54) GRAIN DEHYDRATING COMPRESSOR FOR WET GRAIN SYSTEM AND METHOD

(71) Applicant: NATIONWIDE 5, LLC, Ord, NE (US)

(72) Inventor: Michael R. Thomas, St. Clair, MO (US)

(73) Assignee: NATIONWIDE 5, LLC, Ord, NE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/063,494

(22) Filed: Mar. 7, 2016

(65) Prior Publication Data

US 2016/0257086 A1   Sep. 8, 2016

Related U.S. Application Data

(60) Provisional application No. 62/129,652, filed on Mar. 6, 2015.

(51) Int. Cl.
| | |
|---|---|
| *B30B 9/16* | (2006.01) |
| *B30B 9/12* | (2006.01) |
| *B29C 47/50* | (2006.01) |
| *B29C 47/76* | (2006.01) |
| *B30B 9/26* | (2006.01) |
| *B29C 47/36* | (2006.01) |
| *B29C 47/92* | (2006.01) |
| *B29C 47/80* | (2006.01) |
| *B29C 47/40* | (2006.01) |

(52) U.S. Cl.
CPC ............. *B30B 9/16* (2013.01); *B30B 9/121* (2013.01); *B30B 9/125* (2013.01); *B30B 9/127* (2013.01); *B30B 9/163* (2013.01); *B29C 47/365* (2013.01); *B29C 47/366* (2013.01); *B29C 47/402* (2013.01); *B29C 47/50* (2013.01); *B29C 47/767* (2013.01); *B29C 47/802* (2013.01); *B29C 47/92* (2013.01); *B30B 9/12* (2013.01); *B30B 9/26* (2013.01); *B30B 9/262* (2013.01)

(58) Field of Classification Search
CPC .. B30B 9/16; B30B 9/163; B30B 9/12; B30B 9/125; B30B 9/127; B30B 9/26; B30B 9/262; B29B 7/48; B29B 7/485; B29B 7/487; B29B 7/488; B29B 7/84; B29B 7/842; B29B 7/845; B29B 7/582; B29C 47/365; B29C 47/366; B29C 47/402; B29C 47/50; B29C 47/767; B29C 47/802; B29C 47/92
USPC ......................................... 425/205, 145, 208
See application file for complete search history.

(56) References Cited

U.S. PATENT DOCUMENTS

| | | | | |
|---|---|---|---|---|
| 4,839,193 | A * | 6/1989 | Mange | A23G 3/0205 426/448 |
| 2003/0056657 | A1 * | 3/2003 | Warner | A21C 11/20 99/353 |
| 2009/0304835 | A1 * | 12/2009 | Savich | C08B 31/00 425/72.1 |

* cited by examiner

*Primary Examiner* — Alison L Hindenlang
*Assistant Examiner* — Lawrence D Hohenbrink, Jr.
(74) *Attorney, Agent, or Firm* — Doster Greene, LLC (57) ABSTRACT

A device according to various embodiments for preparing wet grain can include at least a first screw configured to receive wet grain. A second screw receives the wet grain from the first screw. At least one of a compressing element and a dehydrating element is included with at least one of the first screw and the second screw to cause a physical property change to the wet grain.

5 Claims, 10 Drawing Sheets

GRAIN DEHYDRATING COMPRESSOR FOR WET GRAIN SYSTEM AND METHOD

REFERENCE TO RELATED APPLICATION

This application claims priority of U.S. Provisional Patent Application Ser. No. 62/129,652, which was filed on Mar. 6, 2015. The subject matter of the earlier filed application is hereby incorporated by reference.

FIELD OF INVENTION

The present teachings relate to devices and methods that utilizes a screw press for simultaneously dehydrating and compressing granular material, such as, for example, grains, distiller grains, wet distiller grain, and modified wet distiller grains, it into a dense form of a cube, pellet, or tub.

BACKGROUND OF INVENTION

Typically, dry mill ethanol processing potentially creates three forms of distiller grains, depending on the number of times the solids are passed through the dryer system: wet, modified wet, and dried distiller grains. Wet distiller grain contains primarily unfermented grain residues (protein, fiber, fat and up to 70% moisture). In some applications, the wet distiller grain has a moisture content as high as 75% and, in other applications, the moisture content of the wet distiller grain may be higher but no more than 90%. According to some conventional techniques, wet distiller grains are processed wet cake that contains approximately 65% to 70% moisture. Wet distiller grains have a shelf life of approximately four to five days. Due to the water content, wet distiller grains are usually economically viable within 200 km of the ethanol production facility. For example, wet distiller grain can be sold to nearby dairies or feedlots within the immediate vicinity of an ethanol plant.

Modified wet distiller grains, which have been dried further to approximately 50% to 55% moisture, have a slightly longer shelf life of approximately three weeks. Modified wet distiller grains can be marketed to regional facilities, such as dairies and feedlots.

Dried distiller grains, which have been dried more extensively to approximately 10% to 12% moisture, have an almost indefinite shelf life. Dried distiller grains may be stored, sold and shipped to any market regardless of its proximity to an ethanol plant.

Dried distiller grains with solubles, which are commonly known as DDGS, are wet distiller grain that has been dried with the concentrated thin stillage to 10-12% moisture. Typically, DDGS has an almost indefinite shelf life and may be shipped to any market regardless of its proximity to an ethanol plant. However, one of the disadvantages associated with DDGS is that drying is costly, as it requires further energy input.

It may be desirable to provide a system and method for generating a final grain product with sufficient density for effective transportation, handling, and storage practices, without the need for adding additional binders, fillers or a combination thereof. It may be further desirable to provide a system and method capable of generating a final grain product, which will not crumble, break, or split during transport and storage.

SUMMARY

The present teachings may satisfy one or more of the above-mentioned desirable features. Other features and/or advantages may become apparent from the description which follows.

A device according to various embodiments for preparing wet grain can include at least a first screw configured to receive wet grain. A second screw receives the wet grain from the first screw. At least one of a compressing element and a dehydrating element is included with at least one of the first screw and the second screw to cause a physical property change to the wet grain.

A method for preparing wet grain according to various exemplary embodiments can include supplying a first screw with wet grain; transferring the wet grain from the first screw to the second screw; and producing a physical property change to the wet grain by applying a process of at least one of compression and dehydration.

In the following description, certain aspects and embodiments will become evident. It should be understood that the invention, in its broadest sense, could be practiced without having one or more features of these aspects and embodiments. It should be understood that these aspects and embodiments are merely exemplary and explanatory and are not restrictive of the invention.

BRIEF DESCRIPTION OF THE DRAWINGS

The skilled artisan will understand that the drawings described below are for illustrative purposes only. The drawings are not intended to limit the scope of the present teachings in any way.

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention, thus the drawings are generalized in form in the interest of clarity and conciseness.

DETAILED DESCRIPTION OF THE DRAWINGS

Reference will now be made to various embodiments, examples of which are illustrated in the accompanying drawings. However, these various exemplary embodiments are not intended to limit the disclosure. On the contrary, the disclosure is intended to cover alternatives, modifications, and equivalents.

Throughout the application, description of various embodiments may use "comprising" language, however, it will be understood by one of skill in the art, that in some specific instances, an embodiment can alternatively be described using the language "consisting essentially of" or "consisting of."

For purposes of better understanding the present teaching and in no way limit the scope of the teachings, it will be clear to one of skill in the art that the use of the singular includes the plural unless specifically stated otherwise. Therefore, the terms "a," "an" and "at least one" are used interchangeably in this application.

Unless otherwise indicated, all numbers expressing quantities percentages or proportions, and other numerical values used in the specification and claims, are to be understood as being modified in all instances by the term "about." Accordingly, unless indicated to the contrary, the numerical parameters set forth in the following specification and attached claims are approximations that may vary depending upon the desired properties sought to be obtained. In some instances, "about" can be understood to mean a given value±5%. Therefore, for example, about 100° F., could mean 95-105° F. At the very least, each numerical parameter should at least be construed in light of the number of reported significant digits and by applying ordinary rounding techniques.

Various embodiments described herein enable the preparation of wet distiller grain. The term "wet distiller grain" according to the present teachings relates to wet distiller grain and modified wet distiller grain. Namely, in various embodiments, the wet distiller grain contains up to approximately 70% moisture content. In some applications, the wet distiller grain contains a moisture content as high as 75% and, in other applications, the moisture content of the wet distiller grain may be higher than 75% but not greater than 90%.

Various embodiments described herein process to wet distiller grain by dehydrating the grain while simultaneously compressing the grain into a dense form having a desired shape, such as, for example, a cube, pellet or tube. These shapes are merely exemplary and nonlimiting.

In some embodiments, the apparatus and method employ a series of intermeshed, flighted screws, flighted augers, and the combination thereof. In some embodiments, the screws or augers may include several compression zones having flights that are positioned closely together. In various embodiments, some sections of the screw or auger may include at least one enlarged root diameter. During operation, rotation of the screws causes the intermeshed flights to shear the grain, which generates mechanical heat that causes a physical property change in the wet grain. One example of a physical property change of the grain which may occur during the process is that the screws will exert pressure against the grain material, compressing it in such a manner to squeeze moisture from the grain and vaporize the moisture by elevating an initial temperature of the wet grain to approximately 220° F., without additional heating. In some applications, the physical property change may cause the initial temperature of the wet grain to be elevated to more than 220° F. In other applications, the initial temperature of the wet grain may be less than 220° F. Other physical property changes may be achieved at different stages throughout the process.

In some embodiments, the barrel, the screw, the auger or a combination thereof may also be heated by external sources to assist in providing additional heating to the already elevated temperature of the wet grain. In embodiments directed towards producing a final product having a predetermined shape, the wet grain, after being compressed by the screws, can then be passed through a series of die configurations to produce a final shape having a specified density. In other embodiments, the processing of the wet grain may be finalized without forming a predetermined shape. In such an instance, the wet grain may be loaded into a container, a transport vehicle, or a railroad car and quickly delivered to a specified location.

In various embodiments for preparing wet grain, a dryer unit can include at least a first screw and a second screw, a compressing element, and a dehydrating element. The first screw is configured to receive the wet grain, and the second screw configured to receive the wet grain from the second screw. At least one of a compressing element and a dehydrating element is included within at least one of the first and the second screw to cause a physical property change in the wet grain.

Figure 1:
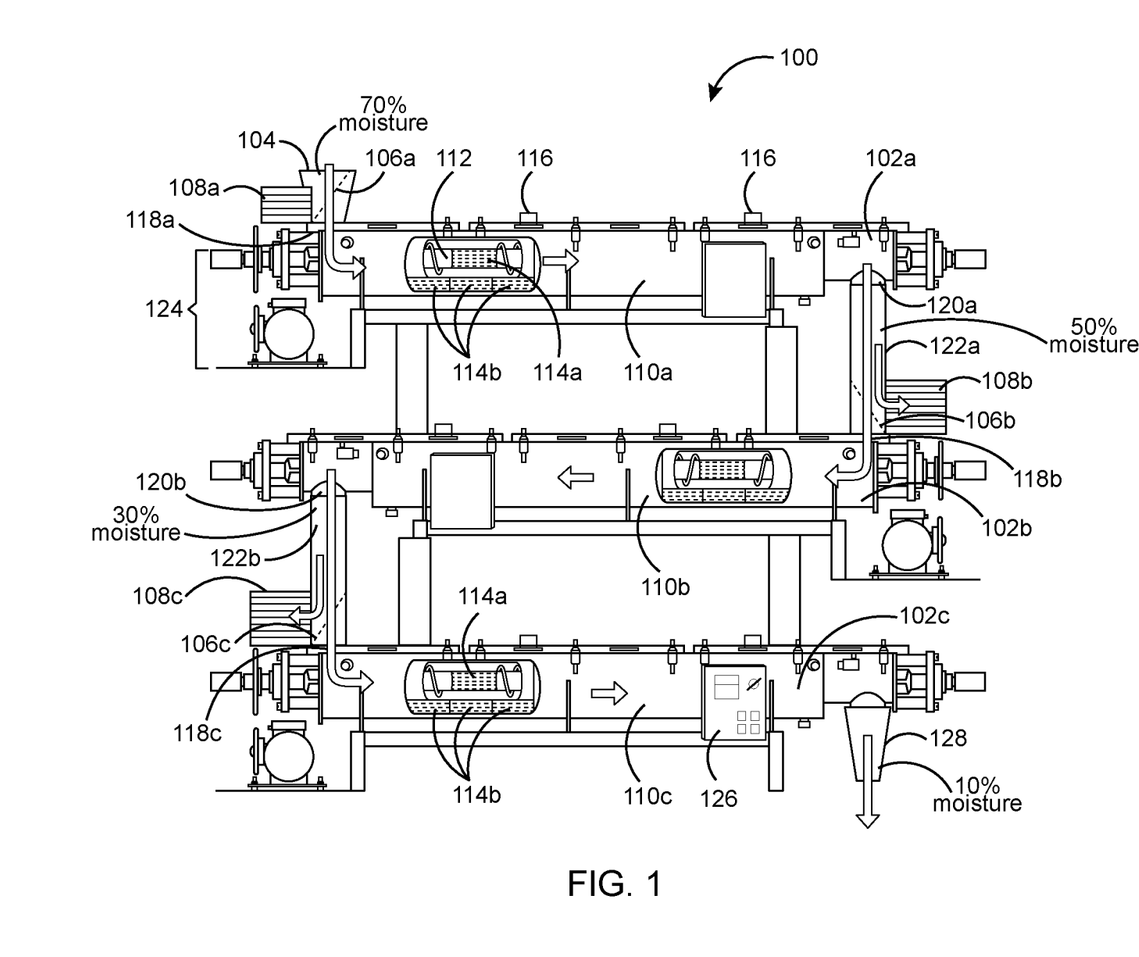
FIG. 1 is a schematic representation of an exemplary embodiment of a grain processing system in accordance with the present teachings.

FIG. 1 illustrates one embodiment of an extrusion system 100. The system 100 may include at one or more extruders 102a, 102b, 102c. Extruders 102a, 102b, 102c may be a screw-type or pump-type extruder, or any variety known in the art. The system 100 may include a single type of extruders or a combination of different types of extruders. Any of the extruders can be configured to carry out one or more of the following exemplary functions, such as compressing, dehydrating, drying, heating, vaporizing, transporting, mixing, shearing, cooking, cooling, pumping, and shaping.

Extruder 102a may be disposed in connection with a hopper 104, one or more heating elements 114a, 114b, and a drive motor and gearbox assembly 124 connected to a barrel 110a of the extruder. In general, the system 100 may be configured to receive raw material at inlet 118a from the hopper 104 at extruder 102a, compress the raw material changing the physical property transforming the raw material, as it advances through the extruders 102a, 102b, 102c, and producing high quality structure products due to accurate control of processing conditions. The raw materials may be solids (powders, granulates, flours), liquids, slurries, and possibly gases. Extruded products may be feed and food products, plastics compounds, chemically modified polymers, cellulose pulps, etc.

Raw materials consistent with the present invention include most granular materials, including but not limited to grains, distiller grains, wet distiller grain, and modified wet distiller grains. One or more screws 112 or other conveying device positioned in barrel 110a, 110b, 110c of extruders 102a, 102b, 102c, respectively, may advance the granular material along an interior passageway of the extruders 102a, 102b, 102c. A discharge outlet 128 may be configured to convey the treated material from the extruder 102c to a die (not shown) for forming a desired product.

It is frequently necessary to transport the granular material from its place of origin to the extrusion system 100 at an extrusion site. The loading operations, as well as the vibrations and jostling associated with vehicular transport to the extrusion site may separate the granular materials into coarse and fine fractions in the truck bed. Thus, the granular material introduced into hopper 104 may include particulate of various sizes, including both coarse and fine granular material. In various embodiments, hopper 104 may include a diverter gate 106a that facilitates the transport of a more homogeneous mixture of granular material by particulate size through the hopper 104 to one or more screws 112. The diverter gate 106a may diverter a portion of the granular material which may enter the hopper from entering the extruder, by redirecting the diverted granular material to a bin 108a.

In various embodiments, heat may be applied to either one or more barrels, screws or a combination thereof. One or more extruders may include at least one of a heated screw and a heated barrel, each having heated surface areas. One or more heating mechanisms 114a may be provided for heating a portion of the screw, such as the screw shaft or a particular zone of the screw. Heating mechanisms 114b may be provided for heating one or more barrels 110a, 110b, 110c. Any conventional heating means can be provided on the inside, the outside, or a combination thereof for applying heat to screws 112, barrels 110a, 110b, 110c, or a combination thereof.

In various embodiments, a portion of a screw or barrel may be heated, and, in other embodiments, the entire screw or barrel may be heated. In various embodiments, all screws or barrels within the system 100 may be heated; whereas, in other embodiments, selected screws, barrels or a combination thereof are heated. In some embodiments, the system 100 may include no additional heating elements.

Figure 6A:
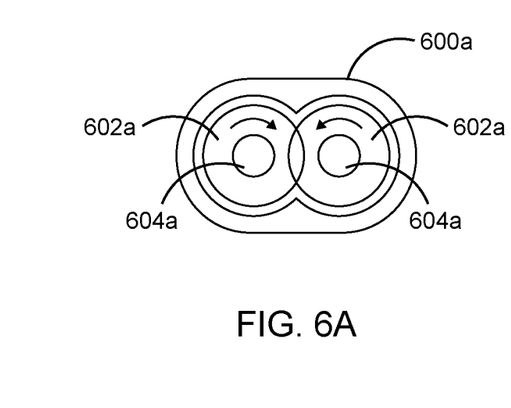
FIG. 6A is an exemplary embodiment of two parallel screws rotating in a counter direction for use in the system according to the present teachings.
Figure 6B:
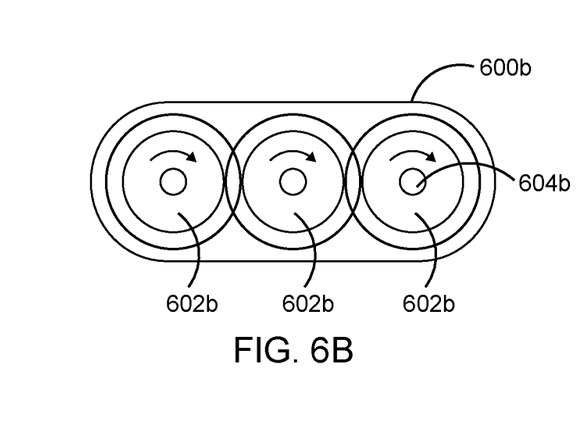
FIG. 6B is another exemplary embodiment of three parallel screws rotating in the same direction for use in the system according to the present teachings.
Figure 6C:
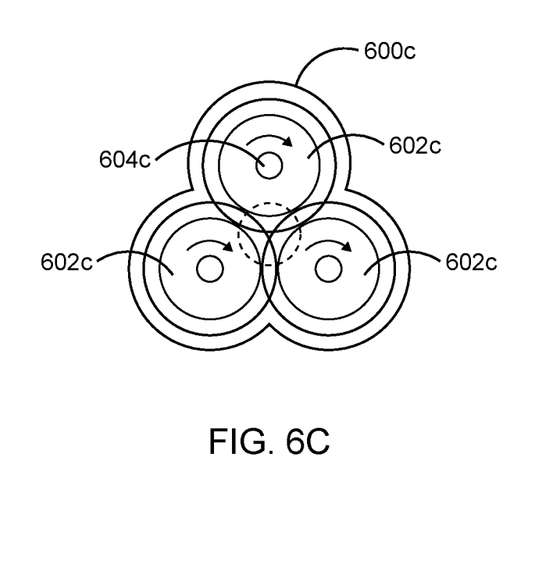
FIG. 6C is a further exemplary embodiment of three stacked screws rotating in the same direction for use in the system according to the present teachings.

In various embodiments, the system 100 may include one or more dehydrating zones. In the event that a dehydration process is performed on the high-moisture granular material, one or more of the extruders may include multiple screws 112 that functions, for example, as a screw dehydrator. The multiple-screw extruders may include, for example, twin-screws or triple-screws as depicted in FIGS. 6A-6C. Different screws can be chosen according to different materials and producing capability. Different types of screws may be employed in different extruders within the system 100. For example, system 100 may include a variety of multiple-screw extruders, whereas some may function as a dehydrator, some may provide compression and not dehydration, and some may provide both compression and dehydration. Some zones within the system may simultaneously compress and dehydrate the grain. When in use, one or more extruder may be configured to possibly take off approximately 20% to 25% moisture away from the wet granular material. In some embodiments, an extruder may be configured to possibly take off approximately 10% to 30% moisture from the granular material.

Also, in various embodiments, there may be provided an additional dehydrating apparatus containing a heater for heating the extruder barrel 110a, 110b, 110c, a dehydrating screen (not shown), and/or a vent 116 for removing steam from the extruder barrel. Moisture is taken away from the granular material when traveling through the dehydrating screen and exhausted at vents 116. The dehydrating screen is optional and may not be provided in some embodiments. The dehydrating apparatus may be connected to the screw dehydrator extruder, connected to another extruder positioned downstream of the screw dehydrator, or a combination thereof.

Figure 2:
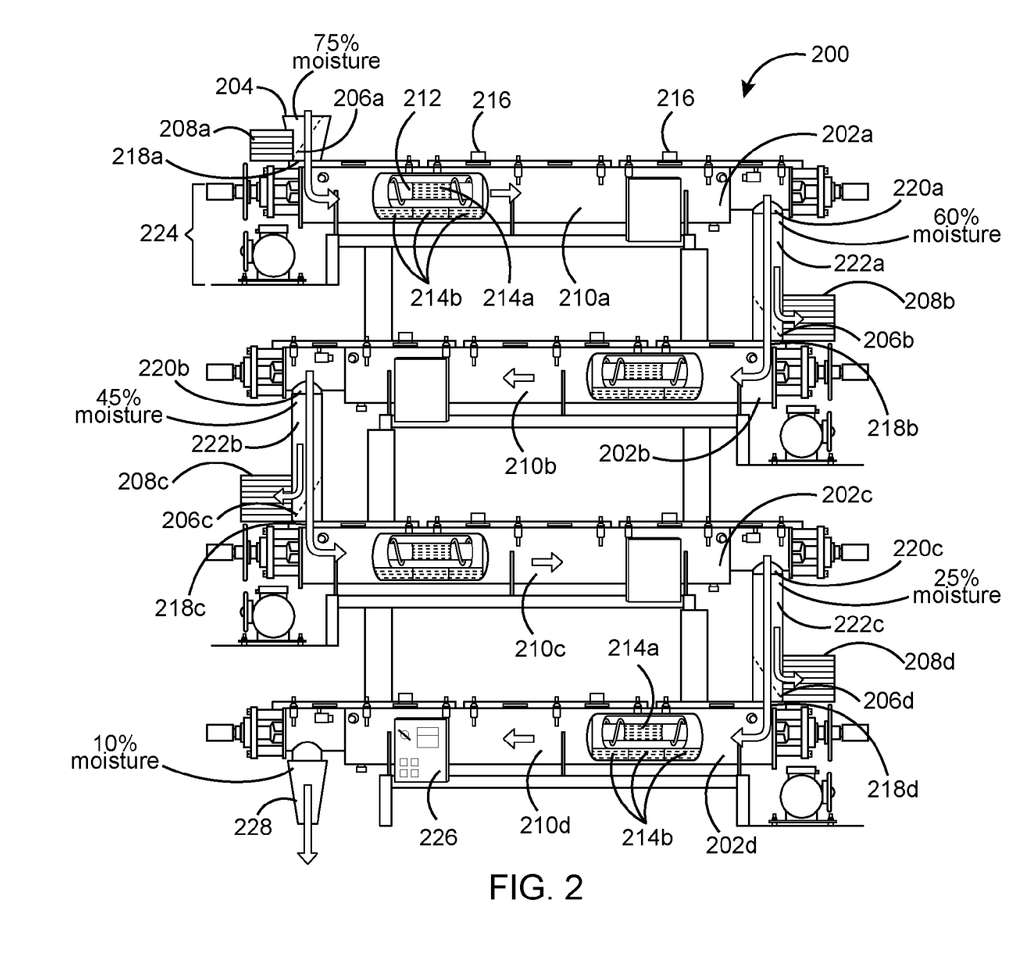
FIG. 2 is a schematic representation of another exemplary embodiment of a grain processing system in accordance with the present teachings.

As illustrated in the exemplary embodiment in FIGS. 1-2, the production of the final extrudate product, according to the present teachings, may take place in two or more stages. For example, the process can be carried out continuously as a multi-stage procedure that includes a plurality of extruders connected in series, parallel, vertically stacked, or a combination thereof such that extrudate from a preceding extruder is fed via a chute 122a, 122b, 222a, 222b, 222c to a next extruder.

Some of the possible multi-extruder arrangements are shown, for example, in FIGS. 1-2. Each extruder 102a, 102b, 102c, 202a, 202b, 202c, 202d in FIGS. 1-2 can be similarly configured having a barrel 110a, 110b, 110c, 210a, 210b, 210c, 210d, a screw 112, 212 disposed within each barrel, and a drive motor and gearbox assembly 124, 224 connected to the barrel of the respective extruders. Each extruder 102a, 102b, 102c, 202a, 202b, 202c, 202d may be configured to received granular material at inlets 118a, 118b, 118c, 218a, 218b, 218c, 218d, compress the granular material changing the physical property as it advances through the extruders, and discharge the granular material from the respective outlets to the next extruder. One or more heating elements 114a, 114b, 214a, 214b may be provided to apply heat to at least one of the barrels 110a, 110b, 110c, 210a, 210b, 210c, 210d and screws 112, 212, as described above.

According to the present teachings, it is possible to design a system that include multiple extruder units arranged in series or parallel flow or a combination of both serial and parallel flow configurations. In FIG. 1, a plurality of continuous extruders is shown arranged in a serial flow arrangement. The example in FIG. 1 depicts three extruders designated as unit 1 (102a), unit 2 (102b) and unit 3 (102c) arranged in a serial flow treatment arrangement where the treated material, such as wet distiller grain, is transformed into a dried final product that is discharged from outlet 128. In FIG. 2, four extruder units are shown where the four serial extruders 202a, 202b, 202c supply granular material to a dried final product at the discharge outlet 228 for collection in a storage or shipping bin (not shown) or to a die (not shown) for forming the shape of the final product. In other embodiments, extruder units can be arranged in a combination of both serial of parallel flow configurations.

Using multiple extruder units connected in parallel, series, or both can enable simultaneous multiple drying stages, the combination of the treated material at different stages, and splitting the treated material into two or more drying or discharge paths. The decision to use multiple extruder units can be dictated by the size, length and cost of the extruder assemblies and the size of the facility. Another major consideration that may determine whether single or multiple extruder units are used is the physical constraints of the facility in which the system will be housed.

In FIGS. 1-2, screws 112, 212 or other conveying device in the extruders 102a, 102b, 102c, 202a, 202b, 202c, 202d may advance the treated granular material along an interior passageway of the extruders. Extruder 102a, 102b, 202a, 202b, 202c also may be in fluid communication with a chute flow path 122a, 122b, 222a, 222b, 222c at outlets 120a, 120b, 128, 220a, 220b, 220c, 228 located at an end opposite from inlets 118a, 118b, 118c, 218a, 218b, 218c, 218d respectively. From the preceding extruder, the treated granular materials may be carried through chute 122a, 122b, 222a, 222b, 222c and into the interior of the next extruder. The discharge chute 128, 228 may be configured to convey the treated material, as dried distiller grain, from the extruder 102c, 202d to a die (not shown) for forming a desired product.

One or more chutes 122a, 122b, 222a, 222b, 222c may be equipped with an internal diverter 106b, 106c, 206b, 206c, 206d that assists in controlling the flow of material through the section. The diverter provides a discharge path for the extruder operator to divert portions of the granular material exiting the preceding extruder before it enters into the next extruder. The diverter 106b, 106c, 206b, 206c, 206d functions to split the stream of material as it flows downwardly through the chutes 122a, 122b, 222a, 222b, 222c. Some of the diverted material may be redirected to bins 108b, 108c, 208b, 208c, 208d, and some of the material may flow freely to the next extruder. This functioning of the diverter 106b, 106c, 206b, 206c, 206d can assure selective distribution of the material flow through the chutes 122a, 122b, 222a, 222b, 222c based on a predetermined moisture content of the granular material for a specific stage of the process. The diverter can be used to check whether the granular material is properly dried before the flow stream is channeled into the next extruder. It also provides a method of sampling or collecting a portion of the granular material being discharged from the preceding extruder having a predetermined moisture content.

In the example of FIG. 1, when in use, a granular material, such as a wet distiller grain, having a 70% moisture content is fed into extruder 110a and compressed and dehydrated taking off approximately 20% moisture away from the wet granular material. One of the many advantages of applying mechanical pressure in an extruder, according to the present teachings, is the development of heat due to the compression occurring within the extruder itself. The compression and shearing force generates heat which in itself aid in the removal of moisture from the wet granular material as the material travels along the screw of the extruder.

At the discharge outlet 120a, a portion of the grain exiting extruder 110a having a 50% moisture content may be redirected from the chute 122a flow path via diverter 106b to bin 108b for collection. At the next stage in extruder 110b, the granular material is further compressed and dehydrated taking off approximately an additional 20% moisture away from the granular material. At the discharge outlet 120b, a discharged portion of the grain having a 30% moisture content may be redirected from chute 122b via diverter 106c to bin 108c for collection.

In comparison, system 200 in FIG. 2 is similar to system 100 in FIG. 1, with the exception that the wet distiller grains fed initially into system 200 has a higher moisture content. Therefore, system 200 includes more drying extruder units and more discharge paths that allows the collection of more material in the bins during the process than system 100. When the exemplary embodiment in FIG. 2 is in use, a granular material, such as a wet distiller grain, having a 75% moisture content is fed into extruder 210a and compressed and dehydrated taking off approximately 15% moisture away from the wet granular material. At the discharge outlet 220a, a portion of the grain exiting extruder 210a having a 60% moisture content may be redirected from the chute 222a flow path via diverter 206b to bin 208b for collection. At the next stage in extruder 210b, the granular material is further compressed and dehydrated taking off approximately an additional 25% moisture away from the granular material. At the discharge outlet 220b, a discharged portion of the grain having a 45% moisture content may be redirected from chute 222b via diverter 206c to bin 208c for collection. At the following stage in extruder 210c, the granular material is subjected to a further compression and dehydration process taking away approximately 20% moisture away from the granular material. At the discharge end 220c, a select portion of the grain having a 25% moisture content may be redirected from chute 222c via diverter 206d to bin 208d for collection.

In lieu of loading the grain into bins 108b, 108c, 208b, 208c, 208d, the grain may be loaded into a transport container, a transport vehicle, or a railroad car and quickly delivered to a specified location.

In various embodiments, a control system may be provided in the system 100, 200. The control system may include a controller 126, 226 in communication with an operator interface. The operator interface may include a monitor and keyboard, a touchscreen, a laptop, and/or any other device suitable for receiving input from a user. For example, the operator interface may include software that prompts a user to input variables and reference values, such as time intervals, temperatures, pressure minimums, pressure maximums, safety factors, and screw-rotation speed.

The controller 126, 226 may be any suitable type of controller known in the art, such as, for example, a programmable logic controller ("PLC"). The controller 126, 226 may be in communication with an extruder speed potentiometer (not shown). The extruder speed potentiometer may be configured to receive an input from a user relating to an extruder setting, and to convey a corresponding analog signal to the controller 126, 226. The controller 126, 226 also may be in communication with the extruder drive 124, 224 of the extrusion system 100, 200. Accordingly, the extruder speed potentiometer may be configured to pass an extruder speed setting to the extruder drive 124, 224 through the controller 126, 226. In one embodiment, an extruder speed potentiometer or other extruder control means may be integral with, and/or incorporated into, the operator interface. The controller 126, 226 may also be disposed in communication with one or more diverter gates and configured to selectively operate each diverter gate 106a, 106b, 106c, 206a, 206b, 206c, 206d thereby permitting the entrance of a specific quantity of granular material to the screws 112, 212. Of course, such selective operation of diverter gate 106a, 106b, 106c, 206a, 206b, 206c, 206d may be accomplished manually.

The control system also may include at least one moisture content sensor (not shown). For instance, the control system may include a moisture content sensor in communication with a flow path of discharge chutes 122a, 122b, 222a, 222b, 222c between a preceding extruder and a subsequent extruder. One or more chutes 122a, 122b, 222a, 222b, 222c can be equipped with a moisture content sensor (not shown), of any variety of direct and indirect sensing methods known in the art, for determining the moisture content of the grain passing therethrough. For example, the moisture content sensor may be based on electrical resistance, dielectric (capacitance), chemical, hygrometry, nuclear magnetic resonance or microwave spectroscopy. The moisture content sensors can be positioned in a variety of different locations within the chutes.

Accurately monitoring the moisture content such that the grain is collected at a predetermined moisture content is important for several reasons. Moisture content of grain is one of the important parameters always considered when deciding the quality and price of grain, at the stage of storage, processing and marketing. Knowing the precise moisture content of a batch of grain also reduces the likelihood of product waste due to microbial waste. Grain having excess moisture content, if stored for long duration, will spoil due to insect or fungus infestation.

Referring to FIGS. 1-2, the moisture content of the grain redirected for collection in the bins 108b, 108c, 208b, 208c, 208d affects decisions pertaining to further drying, storage, and selling price of the grain. Thus, it is increasingly important for the extruder operator to have a precise measure of the moisture content of its collected grain.

As will be appreciated by one of skill in the art, any configuration of additional pressure and/or temperature sensors may be incorporated in the extrusion flow path and disposed in communication with the controller 126, 226. Such sensors may, if desired, be implemented into additional calculations and threshold comparisons for detecting the occurrence of the physical property change in the granular material and/or for optimizing the output of the extruder drive 124, 224.

In various embodiments, system 100, 200 can be configured to accommodate a wide range of compression screws with differing structures or geometries that create compression on the treated material. For example, in various embodiments, each extruder 102a, 102b, 102c, 202a, 202b, 202c, 202d may include one or more screws. FIGS. 3A-5 depict various examples of screws that can be employed in system 100, 200. The examples shown in FIGS. 3A-5 illustrate dual or twin screws. Those skilled in the art would recognize that a single screw, a triple screw, a plurality of screws, or a combination of a variety of screws arranged, for example as shown in FIGS. 6A-6C may be used to compress and dehydrate the treated material.

In various embodiments employing twin or multiple-screw extruders, the screws can rotate in opposite direction (counter-rotating) (FIG. 6A) or the same direction (co-rotating) (FIGS. 6B-6C) or opposite direction (counter-rotating). The screw can include multiple sections that consist of non-intermeshing flights, fully intermeshing flights or a combination of both types of flights. In some embodiments, such screw extruders may be modular, and the screw design can be changed by rearranging the feeding, venting, and mixing elements along the screw shaft.

In various embodiments, the screw(s) are configured to include various mixing zones. In some embodiments, the system 100, 200 may employ an extruder 300 (partially shown) comprising set of twin intermeshed screws having various mixing zones. In such an embodiment, the screw can be designed wherein each section has uniquely different sets of flight geometry to perform specific compression functions. For example, sections of the screw geometry can be configured to create perpendicular compression, lateral compression, or a combination thereof. Perpendicular compression can be created by forcing the treated material through tighter cavities of the flights and roots of the screw. Lateral compression can be created by employing a screw configured to have changes within different sections to the number of flights and/or the pitch of the flights.

According to the present teachings, the particulate is pushed forward by a set of twin screws 346, 348, 446, 448, 546, 548 with the unique geometry as illustrated through FIGS. 3A-5, as will be explained in more detail below, such that when positioned, timed, and rotated in specified direction, this creates an effect on the particulate that flows like a fluid under pressure. Namely, this means, for every rotation of the screw, the grain moves forward from a feed section towards the tip of the screw. With each rotation, it forces the grain through particular areas of the flights, as well as the root of the screws, where the grain is compressed. This point of compression is unrelated to the restriction created by a conventional die(s), located downstream of the tip of the screw. Rather, this compression occurs due to the design of the screw.

Figure 3A:
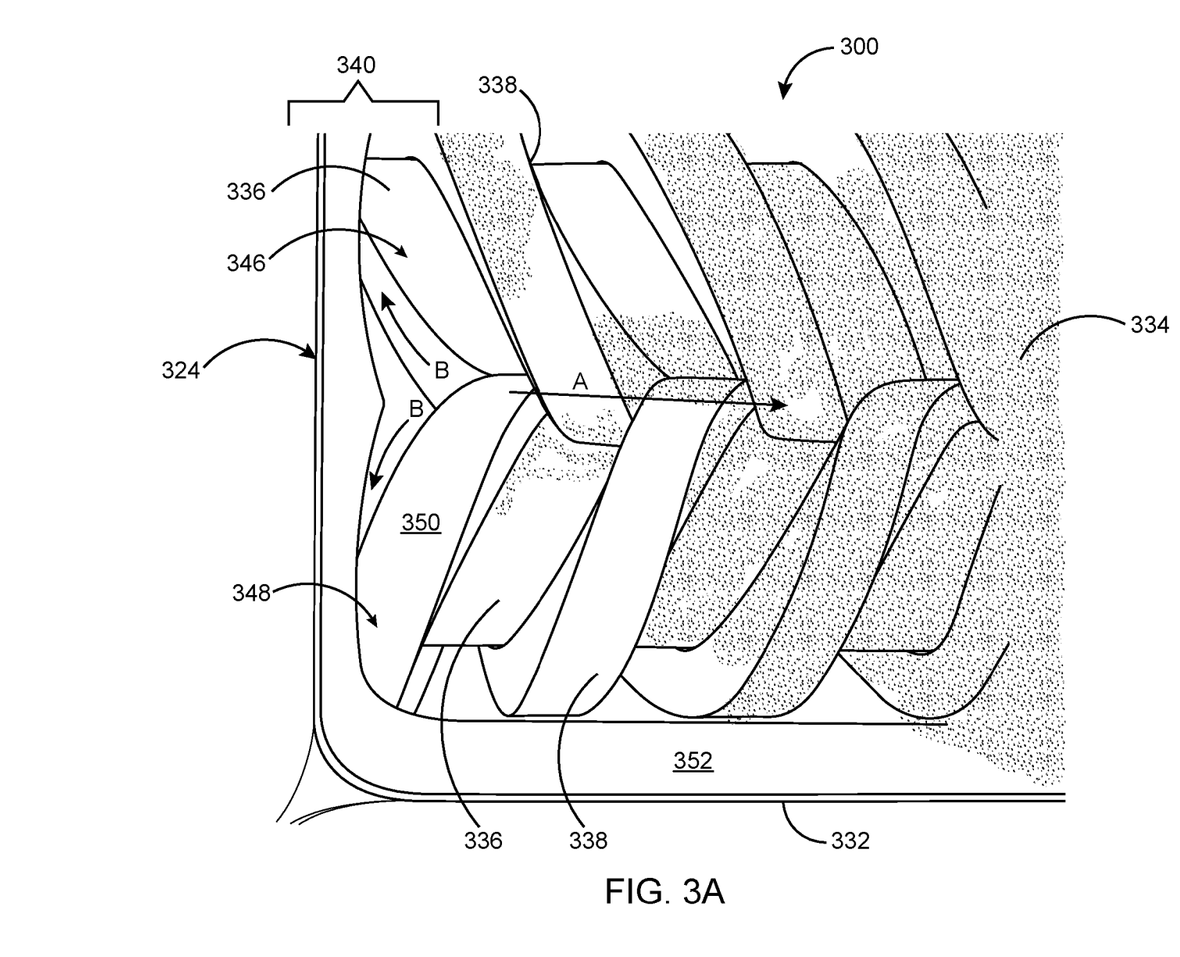
FIG. 3A is a perspective view of a screw assembly of the grain processing system in accordance with the present teachings.

As illustrated in the exemplary embodiment of FIG. 3A, the compression screw assembly 324 includes a plurality of screws 346, 348 and barrel 352. In the preferred embodiment, the plurality of screws includes a first screw 346 and a second screw 348. The first and the second screws 346, 348 may include a feed section 340, followed by a plurality of middle sections 442 (best shown in and described with regards to FIG. 4) and a tip section (not shown). The feed section 340 is adaptable to receive the grains 334 from the feeding hopper (not shown in FIG. 3A). The feed section 340, the plurality of middle sections, and the tip section (not shown) may include a plurality of flights 338 and a plurality of roots 336. The flights 338 are the section of the screws 346, 348 that pushes the material as the screw rotates. The roots 336 are located in the flow channel of the screws 346, 348.

According to one example, the first screw 346 and the second screw 348 rotate in a counter clockwise direction which creates a positive displacement pump that enables the grains 334 to move forward in relation to the plurality of screws 346, 348 from the feed section 340 to the tip section and allows the grains 334 to be positioned in constant contact with the hot surfaces 350, 352 of the plurality of screws 346, 348 and barrels 352, respectively. The moisture present in the grains 334 is trapped within the grain, which helps to provide lubricity in the grains. The presence of the moisture trapped at a high temperature creates a lubrication property that enhances the grains ability to flow when the grains 334 pass through a reduced surface area between the plurality of flights 338 and the plurality of roots 336. The dry grains are sheared utilizing the sharp edges of the plurality of flights 338 and the roots 336.

Figure 3B:
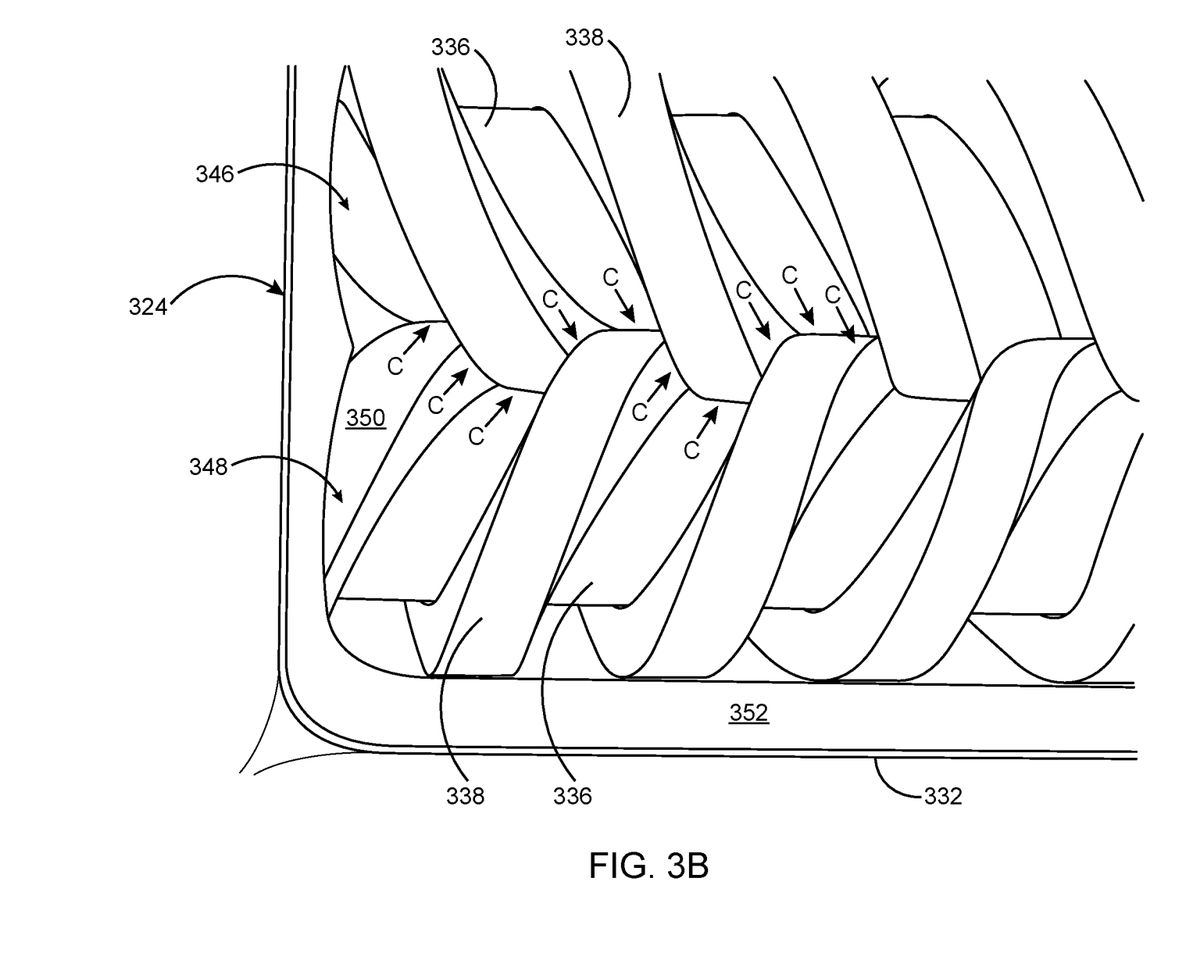
FIG. 3B is a perspective view of the screw assembly of FIG. 3A, illustrating a plurality of flights and roots of a first screw and a second screw in accordance with the present teachings.
Figure 3C:
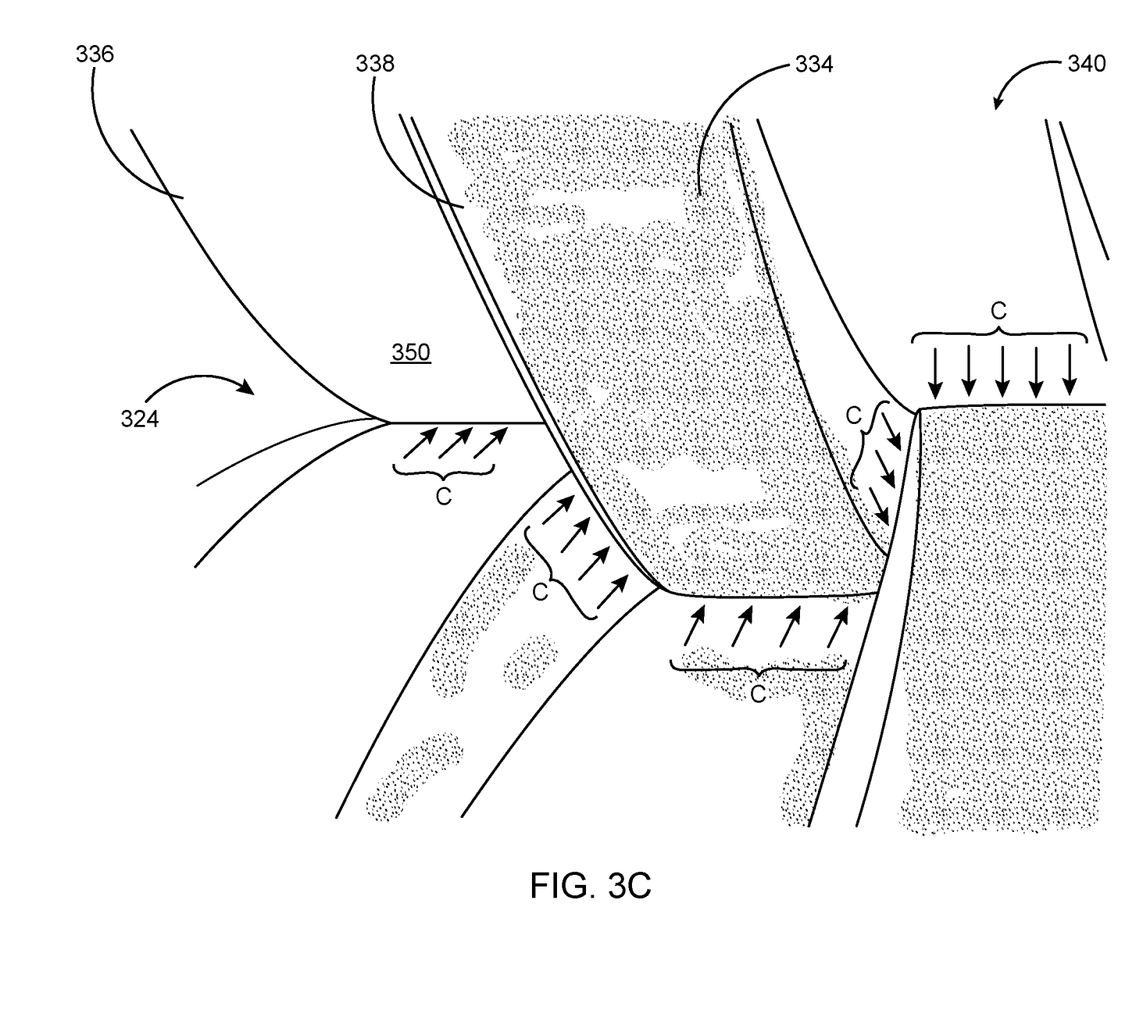
FIG. 3C is a perspective view of the screw assembly of FIG. 3A, illustrating grains passing through a feed section of the plurality of screws in accordance with the present teachings.

As illustrated in FIGS. 3A-3C, the screws 346, 348, are designed such that each includes uniquely different set of flight geometries to perform specific compression functions. FIG. 1 illustrates the feed section 340 where the grains 334 are fed into the point of origin in the flights 338 of the screws 346, 348 installed within a screw assembly 324. The flights 338 are the ridges of the screws 346, 348, and the roots 336 are the bottom portions created between the flights 338 of the screws 346, 348. In this example, the screws 346, 348 rotate in a counter rotating direction indicated by the solid-line arrow B (in FIG. 3A) which advances the grain 334 in a forward direction as shown by the solid-line arrow A in FIG. 3A.

In other embodiments, the screws 346, 348 may co-rotate relative to each other. In some embodiments, the system 100, 200 may be designed to include multiple sets of screws. For example, the system may be configured to include a set of screws that counter-rotates and another set of screws that co-rotates. In this exemplary screw assembly 324, the screws 346, 348 are positioned such that their flights are parallel to each other so that one flight 338 from one screw 346 is situated very tightly between two flights 338 from the other screw 348.

When positioned, timed, and rotated, for example, in a counter clockwise direction, this configuration, as the screws rotate, enables the grain 334 to be forced and compressed in several areas located on the flights and the roots of the screws, as illustrated in FIGS. 3A-3D. This creates a positive displacement pump that enables the grains 334 to move forward in relation to the plurality of screws 346, 348 from the feed section 340 to the tip section and allows the grains 334 in constant contact with the hot surfaces 350, 352 of the plurality of screws 346, 348 and barrels 352 respectively. In some embodiments, a small percentage (i.e., 5%) of the moisture present in the grains 334 may become trapped within the grains which enhances the lubricity of the grains 334 as it passes through a reduced surface area between the plurality of flights 338 and the plurality of roots 336. While the majority of the moisture present in the grain may be removed, as described above.

Figure 3D:
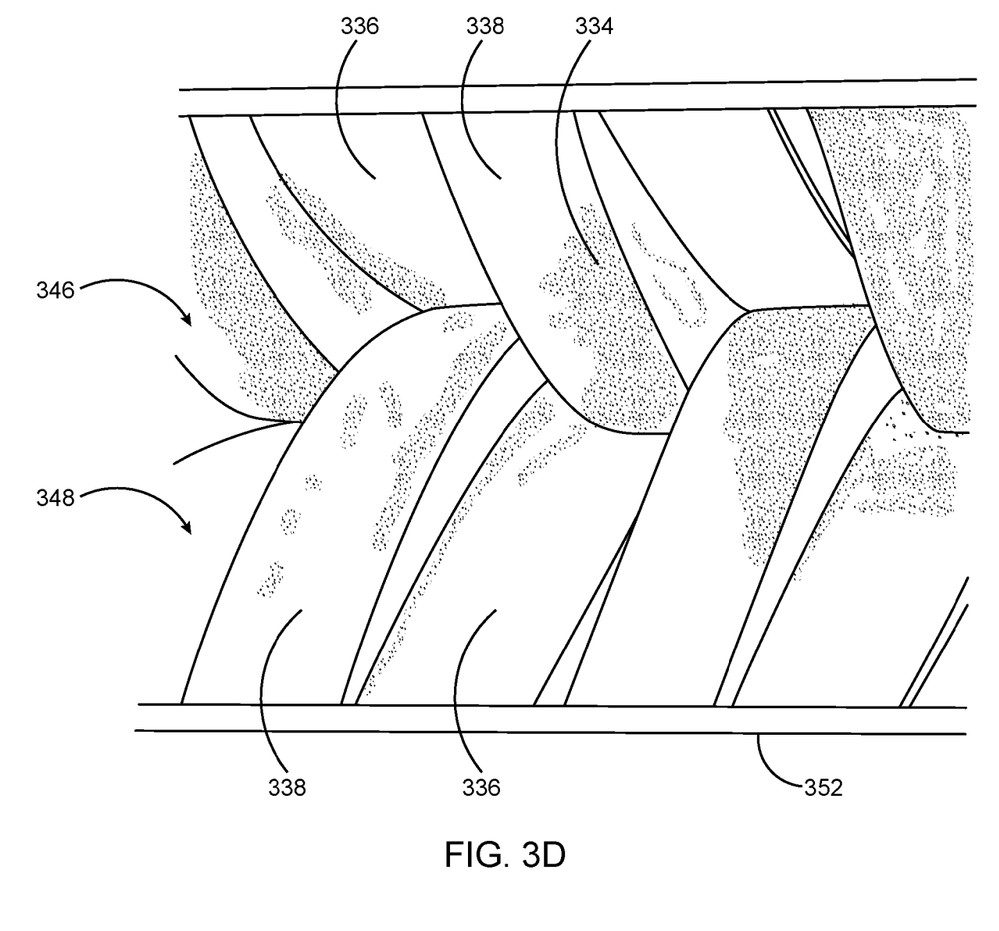
FIG. 3D is a perspective view of the screw assembly of FIG. 3A, illustrating compressed grains at the plurality of flights and roots at the middle sections of the first screw and the second screw in accordance with the present teachings.

As is shown more detail in FIGS. 3B-3D, the grains 334 are forced and compressed in several converging areas (indicated by the solid-line arrow C) located on the flights 338 and the roots 336 of the screws 346, 348. The compression is created by the reduced surface between the plurality of flights 338 and the roots 336. The edges of the flights 338 and roots 336 entrap the grain 334 within the area indicated by arrow C. As the grains 334 get compressed between the flights 338 and the roots 336, a perpendicular compression (perpendicular to the flow of material which is from the feed section 340 to the tip section (not shown) of the screws 346, 348) is created. This perpendicular compression derives at least two beneficial effects (by design) on the material. First, one benefit is that, it creates a mechanical compression which generates mechanical heat which directly applies heat to the grains 334. Secondly, the perpendicular compression changes the mechanical properties of the grains 334, thereby making fine granules of the grains 334 that are substantially modulus such that these granules can be pushed into smaller orifices of die(s) (not shown) located downstream from the tip section (not shown) of the screws 346, 348. Namely, the grains should be sufficiently fine so as to flow like a fluid. Further, this granule sized grains are bound into final product having a dense form. In addition, each time the grains are compressed by the screws, air present in the grain is removed. This removal of air is one of the factors that allow the grains to be compressed into a more condense form in the die.

The edges of the plurality of flights 338 are intentionally designed to be very distinct and sharp so that they can shear the grains into a very fine particulate. Shearing is an effective way to apply heat to the grains 334, because it self-generates heat during the process. An additional advantage of system 100, 200 is that, the plurality of screws 346, 348 rotates at higher rotation per minute (RPM) which increases the shear rate at an exponential rate by design which in turn reduces the operating cost of applying heat as well as breaks down the particulate to make it more compressible and bindable.

Figure 4:
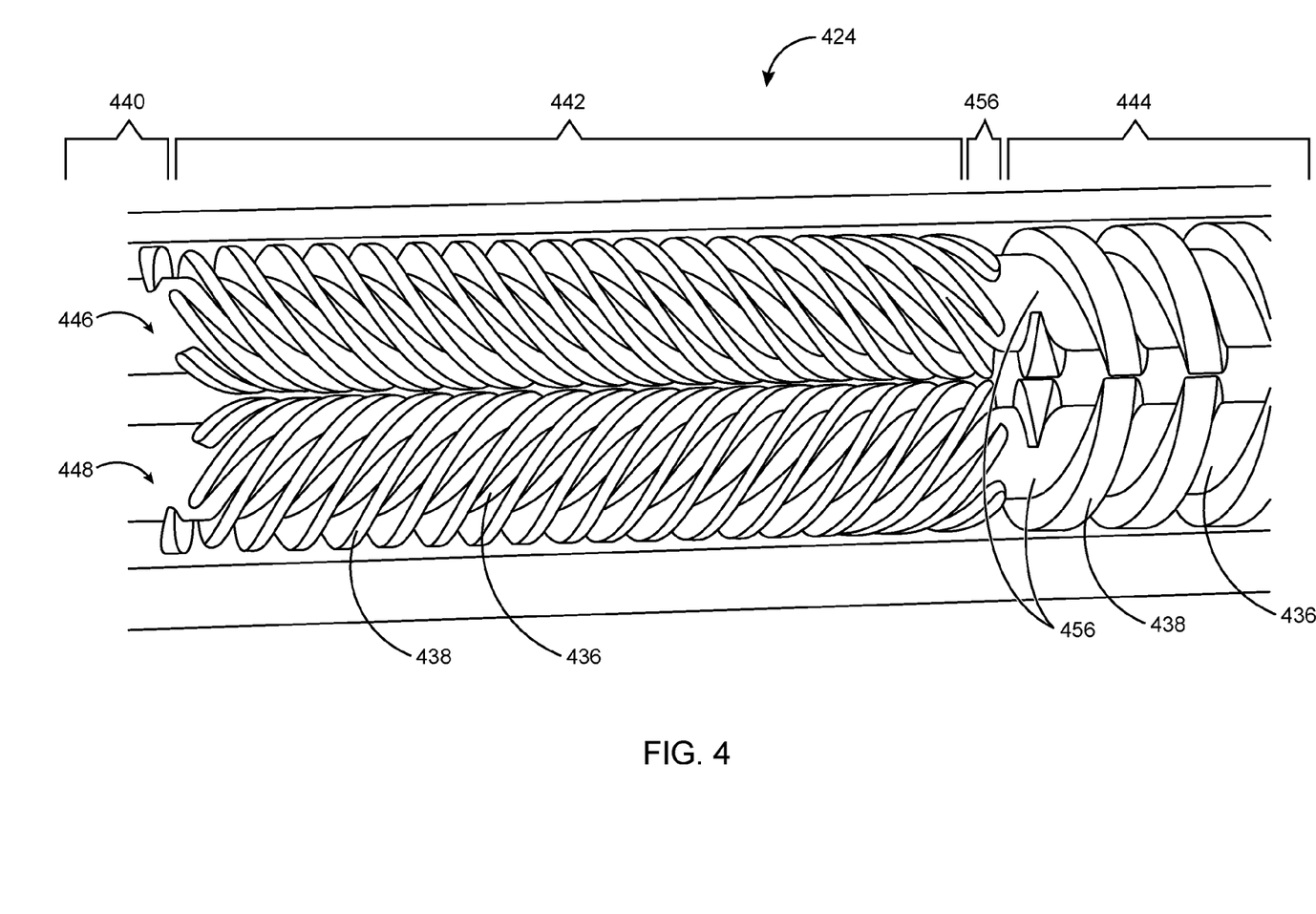
FIG. 4 is a perspective view of a screw assembly illustrating the feed section and a plurality of middle sections in the plurality of screws in accordance with the present teachings.

FIG. 4 illustrates another exemplary embodiment of a screw assembly 424 comprising screws 446, 448 having a transition section from the feed section 440 to a more aggressive first middle section 442 to a less aggressive middle section 444. In this transition section, more compression force occurs because more flights 438 are included per linear inch. This causes increased compression force and generates the production of more heat. Also, a backup region 456 is provided while the grain 334 is transitioning from this first middle section 442 to the second middle section 444. The backup region 456 causes a backup of grain flow which creates lateral compression in the material similar to the compression created by forcing the grain through the smaller orifices in a die. In the backup region 456, the grain slows down, because of the transition and grain backs up in the flow creating the lateral compression. As the grain advances to the less aggressive middle section 444, the grain encounters less aggressive compression because fewer flights are provided within this section.

Figure 5:
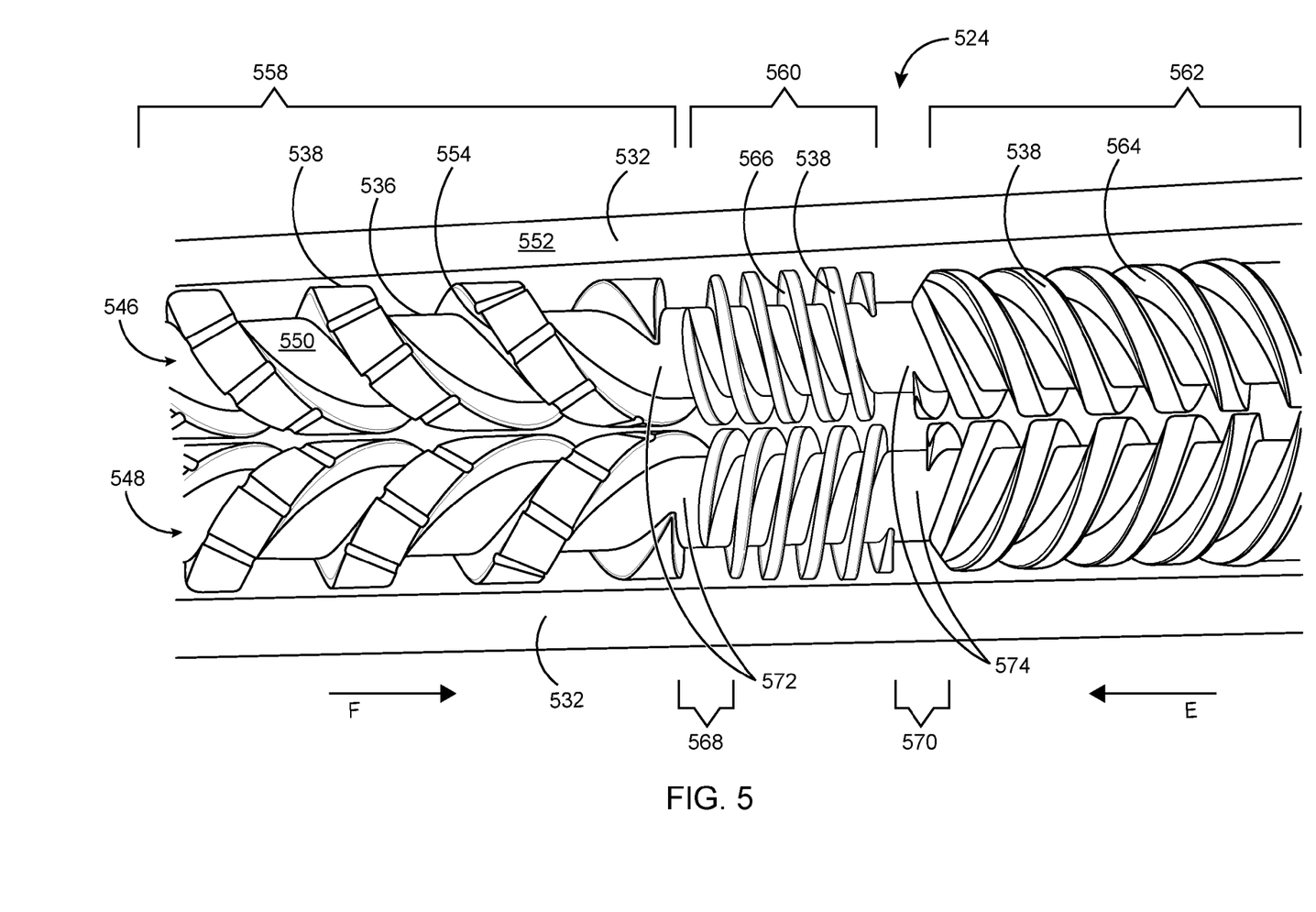
FIG. 5 is a perspective view of a screw assembly illustrating different set of flights and roots in the first and second screws of the animal feed producing system in accordance with the present teachings.

FIG. 5 illustrates another example of lateral compression provided by the design of the screw. In FIG. 5, the screws 546, 548 enclosed within barrel 552 are designed such that there are changes in the number of flights and changes in the flight pitch. In FIG. 5, there are transitions from section 558 having fewer flights 538 spaced apart with a more forward angle of pitch 554 to an intermediary section 560, then to a section 562 having more flights 538 with a far less forward pitch 564. At the intermediary section 560, the grain 334 experiences less flow and more compression forces applied onto the grain 334. At section 562, the flow of the grain increases. The transition from sections in the screws 546, 548 comprising different number of flights and flight pitches is another form of creating lateral compression. This compression force applied onto the grain is produced as a result of the screw design. Thus, the lateral compression can be performed onto the grain at regions of the screw which has nothing to do with having a conventional die with restrictive orifices positioned downstream from the plurality of screws 546, 548. As the grains 334 move forward in relation to the plurality of screws 546, 548 from the feed section 558 to the tip section, the grains 334 are positioned in constant contact with the hot surfaces 550, 532, 552 of the plurality of screws 546, 548 and barrels 552, respectively In FIG. 5, as the grain travels through the points of compression, initially, the grain flows faster through section 558, because the angle of pitch 554 is the most forward. Next, the grain slows down to its slowest speed through section 560, because the angle of pitch is the least forward. Then, the grain speeds up through section 562, but at a rate slower than in section 558, because the angle of pitch 564 is less forward than the angle of pitch 554. On the other hand, the material flows through section 562 faster than section 560, because the angle of pitch 564 is more forward than the angle of pitch 566.

Furthermore, section 560, in FIG. 5, functions as an additional compression zone. Due to the generally flatness of the pitch 566 in section 560, this backs up the flow of the grain into a back-up region 568 or a back-up region 570, depending upon the direction of the grain. Backing up of the grain into back-up region 568 or back-up region 570 creates additional compression onto the grain. When the grain travels in the direction of arrow E, back-up region 568 is developed at positions 572 in front of section 558. In contrast, when the grain travels in the direction of arrow F, back-up region 570 is developed at positions 574 in front of section 564.

Thus, for example, when travelling in the direction of arrow E, the grain travels relatively fast through section 564, then slows through section 560, and speeds up in section 564, but not as fast as in section 558. As the grain travels through section 560, the pressure created in the back-up region 568 is then released. As the grain advances through the twin screws, the grain may encounter several alternating stages of compression and release.

In general, the repeated compression and release as the grain transitions between sections of the multiple screws having different numbers of flights and/or pitches generates substantial shear stress on the grain. The shearing of the grain provides an economical and cost effective manufacturing process that does not require the addition of heat to maintain the process after the initial start-up.

During operation, rotation of the screws causes the intermeshed flights to shear the grain, which generates mechanical heat that causes a physical property change in the wet grain. One advantage of applying mechanical pressure and dehydration in an extruder is the development of heat due to the compression occurring within the extruder itself. The compression and shearing force generates heat which in itself aid in the moisture removal.

One example of a physical property change of the grain which may occur during the process is that the screws will exert pressure against the grain material, compressing it in such a manner to squeeze moisture from the grain and vaporize the moisture by elevating the temperature of the wet grain to approximately 220° F., without additional heating. In some applications, the physical property change may cause the temperature of the wet grain to be elevated to more than 220° F. In other applications, the temperature of the wet grain may be less than 220° F. Other physical property changes may be achieved at different stages throughout the process.

Alternatively, during the startup, as the motor and gearbox 124, 224 (FIGS. 1-2) begin to rotate the screws, a heating mechanism can be utilized to heat the barrel of the screws to approximately 220° F. After the grains start flowing through the screws, the heat of the barrel of the screws is turned off, because the shearing and compression forces generate a substantial amount of heat. Thus, in such embodiments, following the initial startup, the heat is turned off, no supplemental heat is added, and only the motor and gearbox are used to rotate the screws. Therefore, the process according to the present teachings creates a mechanical compression that generates mechanical heat which directly applies heat to the grains, which provides an economical advantage over conventional processes.

FIGS. 3A-5 depict embodiments of different screw geometries having various restrictive areas to create the perpendicular compression (created by forcing grain through tighter cavities of the flights and roots) and the lateral compression (created by changing the number of flights and/or the pitch of the flights). Exemplary embodiments of the screws can have various configurations, such as uniform mixing sections, various mixing sections, a meshed section, a non-meshed section, a lateral compression section, a perpendicular section, a back-up section, and a combination thereof.

FIGS. 6A-6C depict examples of various possible screw configurations according to the present teachings. FIG. 6A illustrates two parallel screws 602a, 602b housed within barrel 600a, wherein rotation of shaft 604a rotates screws 602a, 602b in a counter rotating direction (opposite directions). FIG. 6B shows three parallel screws 602b enclosed within barrel 600b such that rotation of shaft 604b rotates the screws 602b in a co-rotating direction (same direction). FIG. 6C shows three stacked screws 602c surrounded within barrel 600c, rotating shaft 604c rotates screws 602c in a co-rotating direction (same direction). One or more heating mechanisms 114a may be provided for heating a portion of the screw, such as the screw shaft or a particular zone of the screw. Heating mechanisms 114b may be provided for heating a portion of one or more barrels 600a, 600b, 600c.

Figure 7:
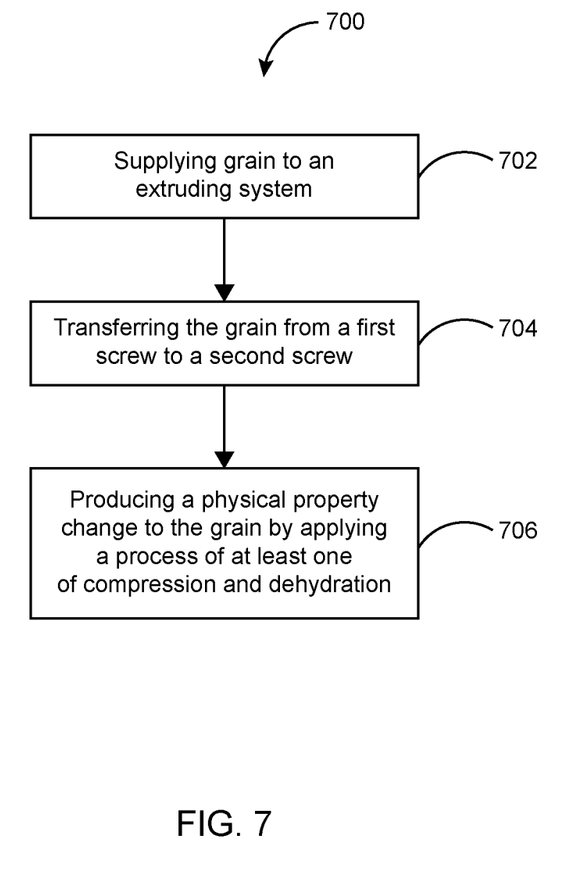
FIG. 7 is a flow chart illustrating an exemplary method for processing the granular material according to the present teachings.

FIG. 7 illustrates one exemplary embodiment of a grain dehydrating compressor for wet grain method implemented according to the systems 100, 200 in FIGS. 1-2. As illustrated in step 702, the method 700 may include the step of supplying grain to an extruding system comprising multiple extruders and advancing the grain for moisture removal at multiple stages through the series of extruders. At step 704, within each extruder, grain is transferred from a first screw to a second screw. At step 706, a physical property change occurs within the grain by applying a process of at least one of compression and dehydration. The grain exits the system as a final product that can be in the form, for example, of pellets, cubes, or tubs.

Unlike conventional extrusion systems, various embodiments of the system 100, 200 described herein enable the production of grains, pellets, cubes, and tubs without the addition of binders and fillers to avoid negatively affecting the nutritional value of the final product. Various embodiments of the distiller grain pellet producing devices produces a livestock feed material in the various forms of distiller dried grains having high shipping durability, high quality, and high nutritional value. The final product provides optimum nutritional value in a very compact and efficient form. Various embodiments extract and collect grain oils and moisture from the distiller dried grains during the production process. Various embodiments produce various structural forms, for example, in the form of pellets, cubes, or tubs having various configurations such as round, square, rectangular or oblong.

Various embodiments of the device provide a high-protein and fat content product, without additives, that can be spread onto the ground as livestock feed in the form of pellets or cubes and is capable of enduring various weather conditions. Various embodiments provide a method that does not require heating or curing after the products exit the device.

Optionally, oils, water, and vapors can be extracted from the distiller grain as it exits the device.

In various embodiments, after exiting the die (not shown), the distiller grain can be cut into nutritional pellets or cubes having a desired length or shape and discharged from the device into a container. The pellets may also be referred to as range cubes.

In various embodiments, a wide variety of different kinds of pellets, cubes or tubs can be produced from various loose granular materials using substantially the same device.

The foregoing description of the preferred embodiment of the present teachings has been presented for the purpose of illustration and description. It is not intended to be exhaustive or to limit the invention to the precise form disclosed. Many modifications and variations are possible in light of the above teachings. It is intended that the scope of the present teachings not be limited by this detailed description, but by the claims and the equivalents to the claims appended hereto.

What is claimed is:

1. A system comprising:
 a hopper configured to receive a raw material having a first moisture content in a range of about 13% to about 90% by weight and an initial temperature;
 a multiple stage dehydrating compressor unit connected to the hopper for receiving the raw material from the hopper and configured to remove moisture from at least a portion of the raw material in sequential stages to produce a substantially dry final product having a second moisture content in a range of about 0% to about 12% by weight, wherein at least some stages of the sequential stages is configured to substantially remove the moisture from the portion of the raw material;
 each of the at least some stages of the sequential stages is configured to remove about 10% to 30% of moisture from the raw material;
 the multiple stage dehydrating compressor unit includes a plurality of extruders connected in multiple stages, wherein one of the extruders is operated at each of the sequential stages, wherein the plurality of extruders includes a first extruder to a final extruder;

the final extruder comprises an open-end barrel continuously in open communication with the atmosphere for dispensing the raw material from the system and configured to vent the raw material to the atmosphere;

each extruder includes an elongated housing having an inlet end for receiving the raw material to be treated, an outlet end for discharging the raw material, and a screw assembly provided within the housing and extending between the inlet end and the discharge end, the screw assembly having a plurality of screws wherein each screw assembly includes:

at least a first screw and a second screw housed within a barrel, wherein the at least first screw and the second screw comprises at least a portion of intermeshing flights to shear the raw material, wherein, as the at least first screw and the second screw rotate, the intermeshing flights shear the raw material generating mechanical heat, without additional heating, so that the raw material undergoes a physical change as the at least first screw and the second screw rotates, such that compressing the raw material between the at least first screw and the second screw squeezes moisture from the raw material and vaporizes the moisture from the raw material by substantially increasing the initial temperature of the raw material, without additional heating;

a backup region, a first aggressive section, and a second aggressive section included within at least one of the first screw and the second screw, the backup region is provided between the first aggressive section and the second aggressive section, wherein the first aggressive section includes at least one of a fewer number of first flights than the second aggressive section and the first flights having a pitch relatively less perpendicular to a direction of movement of the raw material moving along the screws than the second aggressive section, and wherein the second aggressive section includes at least one of a greater number of second flights than the first aggressive section and the second flights having the pitch relatively more perpendicular to the direction of the movement of raw material moving along the screws than the first aggressive section, the backup region is configured to slow down and back up the raw material creating a lateral compression as the raw material advances along the screws, and the backup region is configured to generate heat as the raw material transitions from the first aggressive section to the second aggressive section;

at least one compressor and dehydrating mechanism provided in a portion of at least one of the plurality of extruders and configured to simultaneously apply a compressive force and dehydration to the raw material to assist with removal of the moisture from the raw material as the at least first screw and the second screw rotate moving the raw material longitudinally along and between the at least first screw and the second screw;

a chute interdisposed between the outlet end of a preceding extruder and the inlet end of a next extruder and providing fluid communication between the preceding extruder and the next to discharge the raw material from the outlet of the preceding extruder to the next extruder;

a vent provided in the inlet end of the housing of the next extruder for venting to the atmosphere, the vent configured to promote flash off of moisture from the housing of the next extruder to the atmosphere;

a processor connected to the multiple stage dehydrating compressor unit and configured to control the multiple stage dehydrating compressor unit to remove the moisture from the at least portion of the raw material;

at least one moisture content sensor connected to the processor and positioned proximate a portion of the chute between the outlet of the preceding extruder and the next extruder, the at least one moisture content sensor being configured to detect the moisture content data corresponding to the moisture content of the portion of raw material moving through the chute between the outlet of the preceding extruder and the next extruder; and a diverter positioned within the chute and connected to the processor for selectively redirecting, based on the detected moisture content data in comparison to a predetermined moisture content data for a respective stage, a specific quantity of the at least a portion of the raw material from a flow path of the at least one chute to the next extruder;

wherein the processor controls the sequential stage moisture removal from the raw material by the multiple stage dehydrating compressor unit based on the moisture content data.

2. A method of removing moisture from a raw material, the method comprising providing the system of claim 1, and reducing moisture from the raw material with the system.

3. The method of claim 2, wherein the raw material having the first moisture content in the range of about 13% to about 90% by weight comprises a granular material.

4. The method of claim 2, wherein the raw material having the first moisture content in the range of about 13% to about 90% by weight comprises wet distiller grain.

5. The method of claim 2, wherein the substantially dry final product having the second moisture content in a range of about 0% to about 12% by weight comprises a dried distiller grain.

* * * * *